United States Patent Office 3,307,932
Patented Mar. 7, 1967

3,307,932
PROCESS FOR TREATING SUGAR PRODUCING PLANTS TO EFFECT IMPROVED SACCHAROSE YIELD
Hubert M. Guyot, Capesterre, Guadeloupe, French West Indies, assignor to Esso Research and Engineering Company, a corporation of Delaware
No Drawing. Filed May 12, 1964, Ser. No. 366,907
Claims priority, application France, Sept. 1, 1960, 837,561, Patent 1,273,464
7 Claims. (Cl. 71—2.3)

This application is a continuation-in-part of Serial No. 119,791, filed June 27, 1961, which was a continuation-in-part of Serial No. 68,348, filed November 10, 1960, both now abandoned.

The present invention relates to a method for increasing the saccharose (sucrose) content of sugar producing plants, e.g., sugar cane and/or the maintenance of this saccharose content at a practically constant level in sugar producing plants, e.g., sugar cane plants that have reached ripeness.

During the ripening of sugar cane, the proportion of saccharose contained in the stock increases regularly and reaches a maximum. This proportion then decreases more or less quickly. Before ripeness heavy rain may decreases the proportion of saccharose in the stalk and promote the sprouting of new leaves. After ripening, rain will also have the effect of a more rapid drop in the proportion of saccharose, this time giving rise to the sprouting of lateral buds on the stalk to give secondary growth.

The ripening curve of a sugar cane crop will, of course, depend on the ripening curves of each of the stalks forming the population of the field. Likewise, in the course of a season, the industrial yield curve will reflect the development of the state of ripeness of the canes cut during the harvest. As a rough approximation, therefore, a distinction can be drawn between three kinds of cane:

Tall growth, aged about 18 months, cut as a rule at the beginning of the harvest.

Shoots aged as a rule against 12 months, for they are harvested about 12 months after the last cutting, i.e. throughout almost the whole of the season.

Small plants aged 10–12 and sometimes 14 months, cut as a rule at the end of the harvest.

The tall growth consists very often of a cane population including:

(a) Over-ripe canes aged about 18 months, these being canes of the first generation known as C1.

(b) Canes of the second generation C2, which may be 10–14 months old, representing the majority of the canes that are of interest from the industrial point of view.

(c) Sometimes again canes of the third generation C3, which often take the form of secondary shoots.

The C2 canes are generally the only ones whose harvesting is profitable, the C1 and C3 canes being those which contribute to reducing the sugar yield of a large plantation. In the course of a harvest, it is thus possible to find in turn different proportions of saccharose according to the cutting periods.

It now has been discovered that the loss of saccharose content in sugar cane in the period immediately preceding cutting can be substantially reduced by treating the sugar cane in accordance with this invention as hereinafter set forth in detail.

One object of the instant invention is to reduce the normal saccharose loss occurring between maturity and cutting by reducing the incidence of new growth, thus maintaining the saccharose level at its maximum ripeness level until harvesting.

Another object of the invention is to increase the saccharose yield of the cane prior to harvesting by inducing artificial ripening of the cane.

To obtain these results, there must be an efficient method which can easily be applied without special precautions; this method must furnish constant results in each case and its application must not have a detrimental effect on the surrounding crops.

It should be pointed out in this latter connection that it is already known how to inhibit the growth of sugar canes by means of spraying substances of the heteroauxine type, such as 2,4-dichlorophenoxy-acetic acid or its salts. These substances have certain drawbacks, however, such as the obtaining of results that are not always constant. Applying these substances, it is moreover necessary to take very special precautions for the dosage and localization of the treatment, so as to avoid, in particular, action that might harm the surrounding crops.

Now the aims and results referred to above have been attained according to the invention without such difficulties being encountered, by applying to the leaves of the sugar canes a mineral oil composition, whose characteristics will be defined below, in a dosage at a fractional level of the phytotoxic limit of the oily composition as regards the sugar cane.

It is well known that mineral oil compositions or even mineral oils alone can be used as fungicides. It has, in fact, been found that certain mineral oils have, in themselves, fungistatic or fungicidal properties. When these oils are used for this purpose, allowance must be made for their phytotoxicity in respect of the plants being treated. If the phytotoxic dose is in fact reached, the plant is usually affected and damage or even destruction of its leaf tissue is observed. It follows that the form of application of the oily compositions is dictated by the phytotoxicity studied in each case of plant being treated for fighting fungi and the following doses employed for this treatment are short of the phytotoxic limit.

It has also been observed that in the case of the application of the phytotoxic dose there is a very great reduction in the growth of the plant. This reduction in growth has not so far as a rule been sought, and it was generally believed should be avoided.

However, the applicant has discovered that in the special case of sugar-producing plants, such as the sugar cane, the saccharose content of a ripened plant is maintained at a maximum level if the primary and secondary growth of the plant is halted. This cessation of growth is observed when the dose of the treatment agent for the plant in question approaches the phytotoxic limit.

The term phytotoxic limit is used herein to refer to that amount of treatment oil which results in a measurable and visible symptom expression on the sugar-producing plant as the development of foliar chlorosis and/or some necrotic spots on the leaves.

The present invention therefore consists of applying to the leaves of the ripened sugar cane, at a time, e.g. 15 days to one month or more, before the theoretical date arranged for the harvest, an oily composition comprising a mineral oil fraction boiling in the range of about 300° F. to 580° F., preferably about 375° F. to 550° F. at 10 mm. Hg, having a viscosity between about 50 to 175, preferably 70 to 110 Saybolt Universal seconds at 100° F. (between 65 and 350 centistokes and preferably between 136 and 280 centistokes), a specific gravity in the range of about 0.840 to 0.890, and an aromatics content (by silica gel) of below about 26, preferably below 15, weight percent, an acid number of at most 0.15 and preferably less than 0.10 mg. KOH per gram. The oil should be essentially free from sulfur or any mineral or organic derivative of sulfur. The oily composition also preferably contains a hydrocarbon polymer. Such additives are particularly of importance in applications made from apparatus mounted on aircraft. The additive is preferably a high molecular weight polymer consisting of monoolefins or a copolymer of a monoolefin and a diolefin and comprises about 0.5 to 10, preferably about 1 to 5, weight percent of the total composition.

Suitable polymers derived exclusively from hydrocarbons include homopolymers of $C_2$ to $C_4$ monoolefins such as polyethylene, polypropylene, polyisobutylene, etc., copolymers of monoolefins and multiolefins, including those of low unsaturation, such as butyl rubber as well as copolymers of isobutylene and ethylene or styrene, natural rubber, synthetic polyisoprene, copolymers of butadiene-1,3 with styrene and polymers of multiolefins such as polybutadiene. Other polymers that may be used include copolymers of butadiene with acrylonitrile, polyacrylic esters, etc. The expression butyl rubber as employed herein is intended to include copolymers containing about 90 to 99.5% by weight of an isoolefin of about 4 to 7 carbon atoms, preferably isobutylene, and about 10 to 0.5% by weight of a conjugated multiolefin of about 4 to 10 carbon atoms, preferably a $C_4$ to $C_6$ conjugated diolefin such as isoprene, butadiene, dimethyl butadiene, piperylene, etc. The polymers employed preferably have a Staudinger molecular weight between about 500 and 100,000 or somewhat higher. Ordinarily, polymers having a molecular weight in excess of 10,000 to 20,000 (Staudinger) will be used. The range of 20,000 to 100,000 Staudinger corresponds to a viscosity average molecular weight from about 150,000 to 1,500,000 or more as determined by the intrinsic viscosity method using the P. J. Flory correlation, "Principles of Polymer Chemistry," Paul J. Flory, 1953, Cornell University Press. The aforedescribed additives or weighting agents may also include small amounts, e.g. 0.1 to 2 weight percent of a metallic salt of a carboxylic acid such as copper naphthenate, aluminum stearate, etc. The composition may also contain an oil-soluble colorant. The polymer may be added directly to the oil used for treatment or first dissolved in a suitable petroleum fraction such as a typical gas oil or fuel oil. The amount of the latter employed would be insignificant and would not change the treating oil from the specified requirements hereinbefore set forth.

In a general way, and according to the plants to be treated according to the invention, if Tc is the phytotoxic dose of the oily composition; if it is desired to apply this oily composition as fungicide, the effective dose, without being harmful to the plant and its development, will be about Tc/10. On the other hand, according to the invention, to act on the development and growth of the plant, the dose for an application that is effective will be equal to Tc—e, e having a value in the range of 1 to 75, preferably 35 to 55, percent of Tc. In other words, the dose to be applied will be considerably larger than when employed for fungicidal effect. Expressed numerically the oil composition should be applied in amounts of about 25 to 99%, preferably 45 to 65%, of the phytotoxic dose.

The content of naphthenic or paraffinic compounds of the basic oil can be variable according to the crudes from which it is extracted, and these derivatives do not seem to have any particularly harmful effects on plant.

Tests have been carried out according to the invention. There will be given below by way of example some results obtained from the yield of a sugar season. They have hade the effect of halting the growth of plants that have already naturally reached maturity, to avoid a loss in the saccharose content either through more prolonged aging or through the effects of rain.

Example I

The tests were carried out as follows, the treatment being performed by aircraft fitted with rotary sprayers.

The sugar cane plantations subjected to the experiment were beaconed to show the aircraft the part to be treated, the rest of the field, or in certain cases a similar field (similar from the point of view of the type of crop and the variety and age of the canes) was kept as a control. This untreated control was preferably selected in such a way that treatment could not be blown over on to it through the prevailing winds.

Sampling was then carried out in the treated and untreated parts in well determined sectors, as close as possible to each other and not varying from one sampling to another. The first sampling was carried out at the time of treatment and the others were scaled at as close intervals as possible. Each sampling comprised a sample taken from the field of 20 to 30 canes from a given spot, the stalks being removed in the order in which they occurred.

The samples thus harvested were sent to the laboratory where they were weighed, crushed in a laboratory mill and then analyzed.

Yield measurements were also carried out at the works in the course of a sugar season.

The following tables show some results obtained both in the laboratory and at the works from samples of canes of different ages.

The dose used averaged 15 liters/hectare. The following results were obtained after a single application of an oily composition comprising 90% by weight of oil and 10% additive. The characteristics of the oil were as follows:

Viscosity _____ 7° E. at 20° C.
Aromatics _____ 9.1% by weight.
Naphthenics _____ 21% by weight.
Sulfur _____ Nil.

The additive was a solvent composition such as a gas oil containing 1% by weight of N-alkyl-gamma-hydroxybutyramide, 2% by weight of aluminum stearate gel, and a pigment known as "oil-soluble green" in the proportion by weight of 1 in 1000.

TABLE I

| Sample No. | Age in Months | Interval in Days in Relation to Start of Treatment | S% C | Control | Difference in Relation to Control |
|---|---|---|---|---|---|
| 1 | 18 | +17 | 12.05 | 11.01 | +1.04 |
| 2 | 10 | +17 | 11.66 | 10.47 | +1.19 |
| 3 | 10 | +17 | 11.33 | 9.58 | +1.75 |
| 4 | 10 | +17 | 11.44 | 8.97 | +2.47 |
| 6 [1] | 10 | +6 | 11.06 | 11.06 | 0 |
| | | +13 | 11.53 | 11.19 | +0.34 |
| | | +18 | 11.13 | 9.97 | +1.16 |
| 7 [1] | 10 | +6 | 10.25 | 10.25 | 0 |
| | | +13 | 9.50 | 7.94 | +1.56 |
| | | +18 | 10.32 | 9.16 | +1.16 |
| 8 | 12 | +4 | 12.66 | 12.66 | 0 |
| | | +7 | 11.50 | 7.50 | +4.00 |
| | | +10 | 11.28 | 8.23 | +3.05 |
| | | +14 | 11.28 | 7.97 | +3.31 |

[1] At works.
S% C = percentage of sugar in cane.

The field in which these tests occurred were differently orientated. This explains the differences obtained in the numerical values of the content in S% C.

These tables always show an appreciable improvement of yield with the treatment according to the invention. It must be stressed that these improved yields represent a very important factor for the industrialist.

The very appreciable yield improvement of test No. 8 will also be noted.

It is obvious that this invention has only been described purely by way of explanation and not restrictively, and that any useful variations may be made to it without departing from its scope. The treatment employing the oily composition hereinbefore described provides the most effective embodiment of this technique. Efforts to effect the same result with oil and water emulsions have proven ineffective. In particular, it may be an advantage to have recourse to a composition according to the invention in the special case of beet or fruit trees growing in temperature and/or tropical and/or sub-tropical regions; it may also be possible to use this composition to bring about the phenomenon known as "artificial sleep" in tropical countries, where there is often no halt in vegetation. It will also be possible to use the composition of the invention to combat frost.

*Example II*

Further tests were conducted using a spray oil fraction from a naphthenic crude and boiling in the range of about 300 to 495° F. at 10 mm. Hg. This fraction had a viscosity of about 75 Saybolt Universal seconds at 100° F., an aromatics content of about 12% by weight and a specific gravity of about 0.8740. To the treating composition was added about 5 wt. percent of an additive comprising an olefin polymer (polyisobutylene), dissolved in a petroleum fuel oil and contained about 1.5 wt. percent copper naphthenate.

Tests were conducted on plots where rainfall varied during the 10 days prior to harvesting. The results are set forth in the following table.

TABLE II.—EFFECT ON SACCHAROSE CONTENT UNDER VARYING RAINFALL CONDITIONS

| Rainfall | Average Percent Increase in Saccharose Yield Due to Treatment |
|---|---|
| Heavy [1] | 5.7 |
| Light [2] | 0.2 |

[1] Areas receiving at least 1.2 inches of rain during the period 10 days prior to treatment until harvesting.
[2] Areas receiving less than 1.2 inches of rain during the period 10 days prior to treatment until harvesting.

What is claimed is:

1. A process for improving the saccharose yield from sugar cane plants comprising treating the said plants about 15 to 30 days before harvest with a mineral oil composition comprising a major amount of mineral oil boiling in the range of about 300° to 580° F. at 10 mm. Hg, having a viscosity in the range of about 50 to 175 SUS at 100° F., a specific gravity in the range of about 0.840 to 0.880 and an aromatic content below about 26% by weight, in a quantity less than the phytotoxic limit of the said oil composition for the particular plants under treatment, said amount being sufficient to substantially halt the growth of said plants.

2. A process in accordance with claim 1 wherein said composition contains an additive comprising about 0.5 to 10 wt. percent of a hydrocarbon polymer having a molecular weight of at least 10,000.

3. A process in accordance with claim 1 wherein said oil composition comprises a mineral oil fraction boiling in the range of about 375° to 580° F. at 10 mm. Hg, having a viscosity in the range of 70 to 110 Saybolt Universal seconds and an aromatics content of below about 15% by weight.

4. A process in accordance with claim 2 wherein said additive contains butyl rubber.

5. A process in accordance with claim 2 wherein said additive contains polyisobutylene.

6. The process of claim 1 wherein said oil composition contains about 0.5 to 2 wt. percent copper naphthenate.

7. The process of claim 1 wherein the dosage is from 11 to 30 liters of said oil composition per hectare.

References Cited by the Examiner

UNITED STATES PATENTS

| 1,914,903 | 6/1933 | Volck | 71—2.3 |
| 2,166,123 | 7/1939 | Boyce | 71—2.3 |
| 3,045,394 | 7/1962 | Coulter | 71—2.1 XR |
| 3,129,529 | 4/1964 | Rumsey et al. | 71—2.1 X |
| 3,138,896 | 6/1964 | Millikan | 71—2.7 |

FOREIGN PATENTS 212,628    12/1960    Austria.

OTHER REFERENCES

Bell et al.: Agricultural Chemicals, April 1950, pages 31–34, 99 and 101.

De Ong: Industrial and Engineering Chemistry, vol. 20, No. 8, August 1928, pages 826 and 827.

Hance: Chemical Abstracts, vol. 26, 1932, page 5695.

Rao et al.: Chemical Abstracts, vol. 51, 1957, col. 15869.

LEWIS GOTTS, *Primary Examiner.*

JAMES O. THOMAS, JR., *Examiner.*